(12) United States Patent
Ronkainen

(10) Patent No.: US 7,721,227 B2
(45) Date of Patent: May 18, 2010

(54) METHOD FOR DESCRIBING ALTERNATIVE ACTIONS CAUSED BY PUSHING A SINGLE BUTTON

(75) Inventor: Sami Ronkainen, Oulu (FI)

(73) Assignee: Nokia Corporation, Espoo (FI)

( * ) Notice: Subject to any disclaimer, the term of this patent is extended or adjusted under 35 U.S.C. 154(b) by 462 days.

(21) Appl. No.: 10/949,733

(22) Filed: Sep. 23, 2004

(65) Prior Publication Data

US 2006/0062382 A1 Mar. 23, 2006

(51) Int. Cl.
*G06F 3/048* (2006.01)
(52) U.S. Cl. .............. 715/822; 715/821; 715/840; 715/816; 715/702
(58) Field of Classification Search ......... 715/702, 715/840
See application file for complete search history.

(56) References Cited

U.S. PATENT DOCUMENTS

| | | | |
|---|---|---|---|
| 6,456,275 B1 | 9/2002 | Hinckley et al. | |
| 6,727,830 B2 * | 4/2004 | Lui et al. | 341/20 |
| 6,976,215 B1 * | 12/2005 | Roderick et al. | 715/702 |
| 7,110,799 B1 * | 9/2006 | Willins et al. | 455/575.2 |
| 2002/0135619 A1 * | 9/2002 | Allport | 345/810 |
| 2002/0174371 A1 * | 11/2002 | Padawer et al. | 713/320 |
| 2002/0180622 A1 * | 12/2002 | Lui et al. | 341/22 |
| 2003/0132961 A1 * | 7/2003 | Aarts et al. | 345/760 |
| 2004/0072589 A1 * | 4/2004 | Hamamura et al. | 455/550.1 |
| 2006/0217105 A1 * | 9/2006 | Kumar et al. | 455/404.1 |

OTHER PUBLICATIONS

Creative NOMAD MuVo TX; http://www.creative.com/products/product.asp?prodid=972; from the Internet Sep. 16, 2004.
Tap-and-Hold Confirmation in eMbedded Visual Basic (Pocket PC Technical Articles); from the Internet Sep. 16, 2004.

* cited by examiner

*Primary Examiner*—Sara Hanne

(57) ABSTRACT

A method, apparatus, and software are presented for a device to provide information about operation of a button during operation of the button. The button performs a first action if the button has been operated a first way, and performs a second alternative action if the button has instead been operated a second way. The user is provided with information, during the operation of the button, indicative of the second way.

32 Claims, 3 Drawing Sheets

METHOD FOR DESCRIBING ALTERNATIVE ACTIONS CAUSED BY PUSHING A SINGLE BUTTON

FIELD OF THE INVENTION

The present invention relates to buttons of a user interface, and more particularly to the functionality of those buttons.

BACKGROUND OF THE INVENTION

The invention is related to user interfaces where, for example, a long press of a button is used to perform a different function from a short press. Using a single button instead of multiple buttons to accomplish more than one functionality presents a very significant opportunity to reduce the hardware features of devices, especially small devices like wireless phones.

For example, consider the backspace key on a typical computer keyboard. Pressing it briefly will delete a single character, but if the backspace key is held down during a slight lapse of time, then the key suddenly begins to delete multiple characters continuously. Other examples include pressing and holding a button for moving clock hands continuously in a wristwatch, or pressing and holding a right key to initiate speech recognition in various mobile phones.

In many user interfaces with limited mechanisms for input (e.g. mobile phones), utilization of the few buttons available is enhanced by separating a short press of a button from a press where the button is held for a longer duration (the duration being preset by the device designer). Sometimes this works very nicely if the functionality occurring from the long key press is a natural extension of the functionality occurring from a short press. For example, it is natural to press and hold the delete button on a PC keyboard to delete many characters. In that case, the long keypress optimizes the user interface (UI) so that it requires fewer keypresses, and also so that the user interface does not require one button for single character deletion and another button for multiple character deletion.

However, when the function resulting from the long keypress is not obvious, and is an alternative to the function resulting from a short keypress, then the user of a prior art device often needs to guess what will happen. Furthermore, the long keypress is often a hidden feature in the user interface, and therefore the long keypress may be left unused. Frequently, the prior art provides no hint to the user that there is an extra alternative functionality that can be accessed by keeping the button pressed. Thus, users are often unaware of their options, especially when the function is a rarely used one (e.g. accessing the list of running tasks by long-pressing an applications key), or when the long press is used as a shortcut to a functionality that can also be reached by navigating through a more elaborate unhidden route in the UI. Style guidebooks often mention that the long-press should be used only when it is a natural extension of a short press, but in practice this rule is often breached.

It is known to hold a button down for a period of time in order to perform a function, such as turning off a device, and it is also known to preface this function by informing the user what will happen if the user continues to hold down the button. For example, a button can be held down, thus causing a progress bar to appear, and once the progress bar is full then the device shuts down. However, this type of device only describes one possible action resulting from release of the button (i.e. shutting down), and releasing the button prematurely causes no action at all. Thus, holding the button down is merely a way of ensuring that the user will not shut off the power unless the user is very certain that he wants the device to shut down, and this technique does not facilitate any actions in addition to shutting down. (The word "action" in this application excludes the do-nothing option.)

It is also known for a user to contact different touch-sensitive buttons in order to explore their functionality before actually pressing those buttons to activate them. See Hinckley et al. (U.S. Pat. No. 6,456,275). However, that technique would not significantly help a user to be aware that a transition (i.e. time-out) from one function to another is nearing, and furthermore that technique would require the user to remember which functionality corresponds to which period of time.

It is further known in the prior art to use soft keys (e.g. buttons that appear on a display screen), in a tap-and-hold manner. For example, an item on a menu can be selected, and a mouse button can be held down until the user selects a desired functionality, and then the user chooses that functionality by releasing the mouse button. Unfortunately, this type of scenario does not offer any advantage for a hard button (i.e. a physical key as distinguished from a soft key). Moreover, even for soft keys, this type of tap and hold scenario will not work if the device lacks a mouse or other similar device.

SUMMARY OF THE INVENTION

The present invention expands the possibilities for including more than one action in a single button. The invention involves describing, for a user, one of a plurality of currently possible alternative actions that can be caused by a button that is currently being operated. When there is a hidden functionality behind the long-press of the button, the user is informed about that hidden functionality by providing to the user a graphical/auditory/tactile hint (i.e. indication).

The method, apparatus, and software presented here enable a device to provide information about operation of the button during operation of the button. The button performs a first action if the button has been operated a first way, and performs a second alternative action if the button has instead been operated a second way. The user is provided with information, during the operation of the button, indicative of the second way.

For instance, when a short-press occurs, there can be a short-press presentation of what action happens if the user releases the button before the short-press functionality times out. In this embodiment of the present invention, the short-press presentation is very brief. This brevity ensures that users familiar with the device's features will not become irritated by the extra feedback. Then, after a short time, there is a long-press presentation of what action will happen if the button is released after a longer depression of the button. In order to ensure that the user understands which action is which, there is a development over time of the long press presentation.

In some cases, the short-press presentation can be omitted, because when the user decides to short-press a button, it is likely that the user knows what he is doing. This knowledge will have been obtained by the user from, for example, a printed label near (or on) the button, or from a softkey text in a user interface (UI) that utilizes soft buttons instead of hard buttons. Note that the words "button" and "key" are used in this application synonymously and in a broad inclusive sense.

Advantageously, in an embodiment of the present invention, the user will get a hint that there is an extra action available behind a long-press of a button, in addition to at least one short-press action. The implementation of at least some features of the present invention is relatively straightforward, because the implementation is primarily a matter of software.

The long-press presentation gives information what the extra functionality is, which can be very important in user interfaces where it is not clear what happens after a long-press. This kind of a problem is often related to bad UI design, but in some cases it can happen that, for example, the button count is extremely limited (e.g. only one button), in which case workarounds need to be utilized.

According to another embodiment of the present invention, a next functionality is described in an increasingly noticeable way, as the next functionality gets closer to potential activation. Thus, as the current functionality approaches a time out, the user is provided with an increasingly emphasized indication of what the next functionality will be.

This indication can be delivered by audio instead of being delivered visually. For example, the device can robotically say with increasing volume, "release button to do A but hold B seconds to do C," and then the device can later say "release to do C but hold D seconds to do E."

According to a further embodiment of the present invention, the device has cyclic functionality. For example, if the user keeps pressing the button, then the series of possible functionalities repeats over time. Therefore, if a user holds a button down after a short-press functionality times out, then the user can still trigger the same functionality by waiting until at least one further time-out.

According to an additional embodiment of the present invention, the user can skip to the next functionality, without having to wait for a time-out. This skipping effect can be accomplished by pressing a button with extra pressure for an instant. Or, the skipping effect can be accomplished by simultaneously pressing another button, or by saying a word like "skip" (if the device has audio recognition capability). Furthermore, instead of skipping immediately to the next functionality, the user can speed up the progression toward the next functionality, for instance by pressing the key harder, and the speed of progression can be a linear function of the pressure applied to the key.

According to another useful embodiment of the present invention, a set of action functionalities for a particular button can be separated by at least one no-action functionality. For example, a no-action option can be provided subsequent to each action option, so that the user will always be able to release a particular button without performing any action. Alternatively, a button could be released, without causing any action, by releasing the button after simultaneously pressing another particular button, or by saying "cancel."

If a button has only two action functionalities, then instead of accessing those functionalities by short-press/long-press, they can be accessed by determining whether or not the user has pressed hard on a button, respectively. For example, while the user is pressing the button, but has not yet pressed with extra pressure, the press-hard option can be described to the user (e.g. in addition to describing the press-soft option), and the user will then have the choice whether or not to press hard before releasing the button. If the user chooses to press hard, then the user will activate the hard-press option instead of the soft-press option.

However, if a button has more than two action functionalities, then hard-press/soft-press can still be used instead of short-press/long-press, by dividing the range of pressures into parts, each part having a different functionality. In this embodiment of the invention, the user selects functionality based upon the last part of the range that was selected prior to release of the button. The parts of the range that are very briefly accessed during release can be ignored by the device's software.

DETAILED DESCRIPTION OF THE INVENTION

Figure 1:
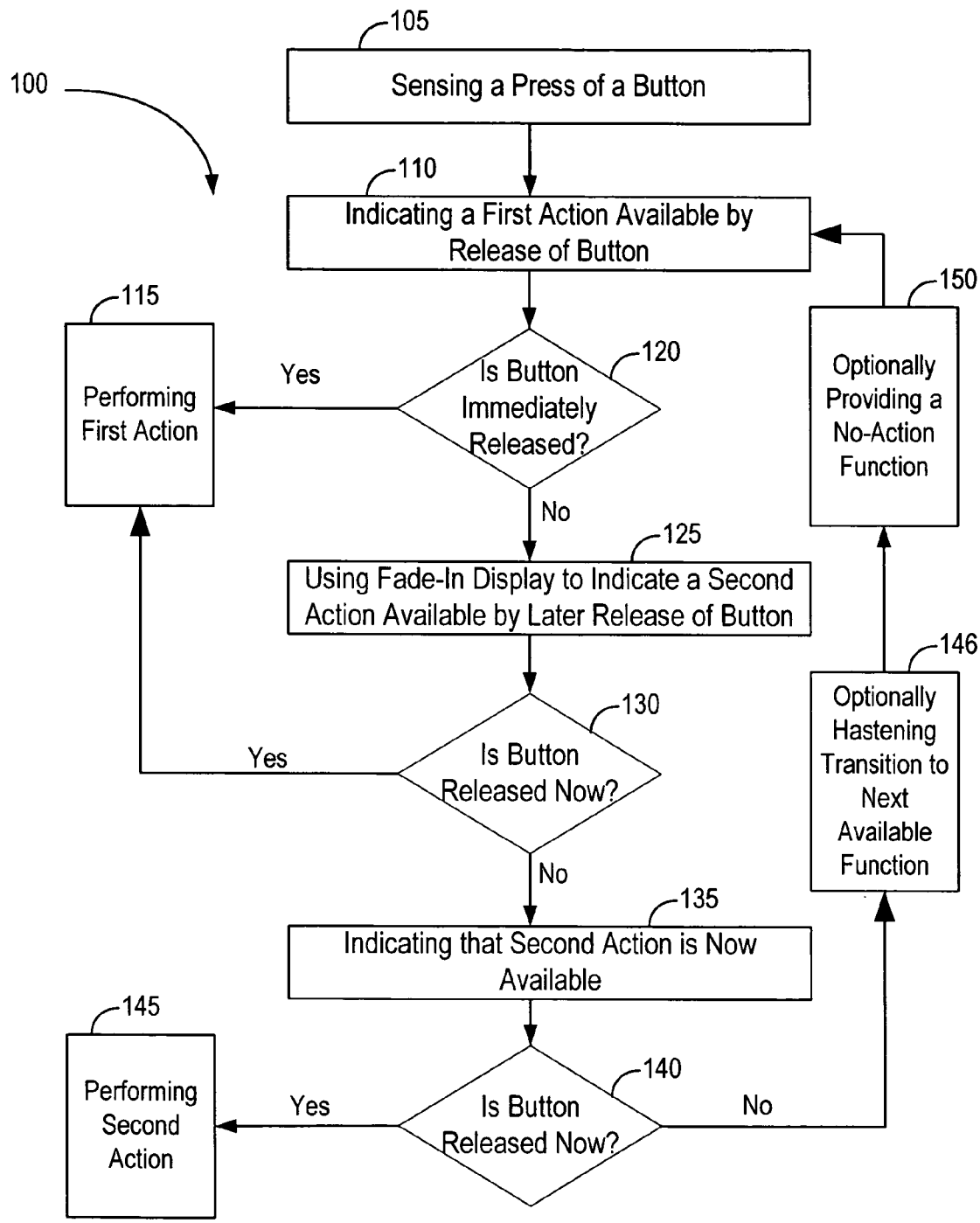
FIG. 1 is a flow chart illustrative of an embodiment of the present invention.

As shown in FIG. 1, the present invention includes a method 100 by which a device can provide information to a user regarding operation of a button located on the device. This button can be a physical button or a virtual (i.e. soft) button. When a user presses 105 the button, the device senses that the user is pressing it. Then, according to this embodiment of the invention, information is provided 110 to the user, during the operation of the button, indicating a first action 115 that the device can perform if 120 the user were to immediately release the button. However, if the user does not immediately release the button, then a fade-in display shows 125 a second action that will later be available by releasing the button. If the button is then released, before the second action becomes available, then the first action is performed 115, but otherwise 130 the button is not released and an indication is provided 135 that the second action has become available. At that time, the user can decide 140 to release the button and thus the second action will be performed 145. However, the user may also decide not to release the button yet, and instead wait for another action or actions to become available. Optionally, the user may hasten 146 the availability of another action, for example by exerting extra pressure to the button. Also, that other action can optionally be a no-action function 150, and furthermore one of those other actions can optionally be the first action 110. In any event, in this embodiment, the fade-in display will alert the user of the coming availability of each successive action.

Instead of waiting for a no-action function 150, it is also possible for the user to release the button, while avoiding any actions, by making a sound if the device is capable of audio recognition, or by pressing another button. Either way, the user can always be assured that the button can be released without the device taking any action. A person of ordinary skill will understand that the method shown in FIG. 1 can be implemented using a software data structure embodied in a computer readable medium.

Although FIG. 1 illustrates a short-press/long-press scenario, it should also be borne in mind that alternatively a soft-press/hard-press could be used instead. This is particularly simple if there are only two possible actions, and which action is determined by how hard the button has been pressed. However, this technique is still applicable when there are more than two actions (or only two actions in addition to a no-action functionality). A selected action corresponds to a latest range of pressure that was accessed prior to release of the button, excluding ranges accessed only briefly during release of the button.

Figure 2:
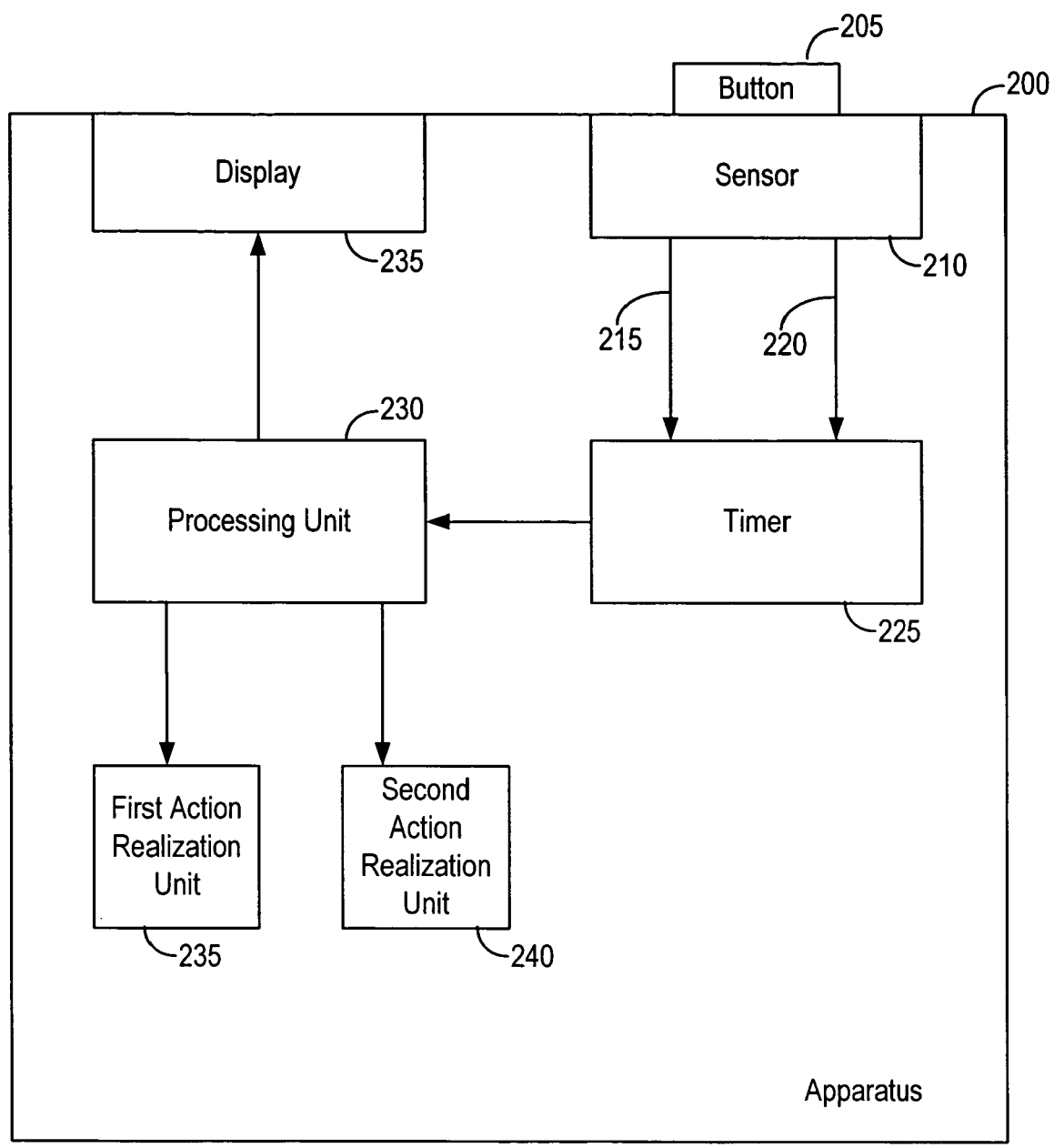
FIG. 2 depicts an apparatus according to an embodiment of the present invention

Turning now to FIG. 2, this shows an apparatus 200 according to an embodiment of the present invention. The user presses a button 205, which is sensed by a sensor 210. The sensor reports both the pressing 215 of the button and the release 220 of the button to a timer 225. The timer passes this information along to a processing unit which controls a user display 235 that helps the user to understand what action will happen if the button is released immediately, as opposed to what action will happen if the button is released later. The processor 230 also controls the means 235 and 240 for making those actions a reality, depending upon when the button 205 is released.

A graphical implementation of the user display of the present invention is described in FIG. 3. Those figures describe an exemplary implementation of the user interface of a device that is capable of receiving and sending files via protocols associated with the Infrared Data Association (IrDa), but the device has only one button allocated for those file transfers. A short press of the button selects IrDa reception, whereas a long-press selects an IrDa send.

Figure 3B:
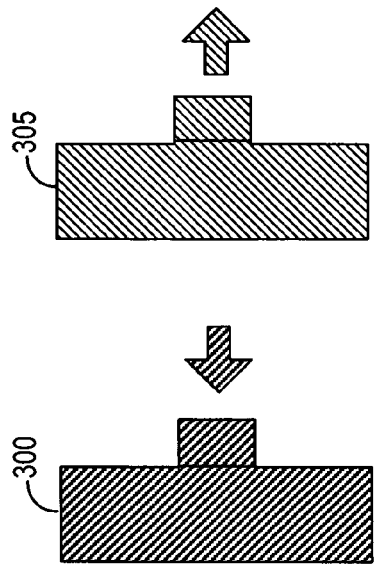
FIG. 3 shows a graphical implementation of the present invention.
Figure 3D:
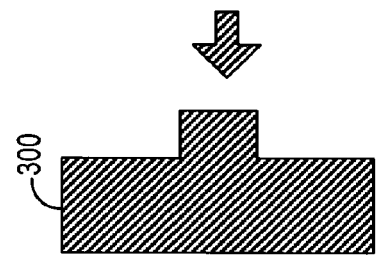
Figure 3A:
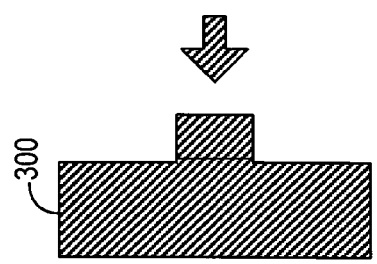
Figure 3C:
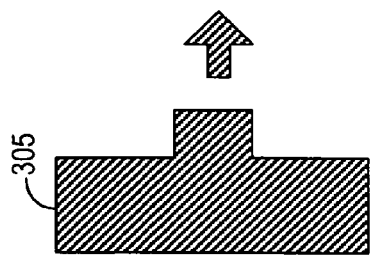

As seen in FIG. 3a, a first press brings up an IR reception icon 300. This icon is shown alone for a fraction of a second (e.g. 100 ms). Then as seen in FIG. 3b, if the user keeps the button pressed, an animation fade-in provides an IR transmission icon 305 alongside the IR reception icon 300, with the new transmission icon 305 continuously brightening and/or darkening as the button is held depressed. As seen in FIG. 3c, if the user keeps the button pressed long enough, the IR transmission icon 305 is displayed at full strength, without the IR reception icon 300. However, FIG. 3d illustrates that, if the button is released before the IR reception icon 300 vanishes, then the new transmission icon 305 vanishes, and the IR reception icon 300 is shown (e.g. for 100 ms) and the IrDa reception starts.

Depending upon the overall UI implementation, an auditory indication can be used, instead of (or in addition to) a visual indication. For instance, an IrDa send may have a special sound in the UI dedicated for it. Similarly a special (different) UI sound can be allocated for IrDa reception. Therefore, when the user presses the infrared (IR) button briefly, the IrDa reception sound starts playing. After a fraction of a second, the IrDa transmission sound is mixed into the IrDa reception sound, first starting at a quiet level but if the user keeps the button pressed, then the IrDa reception sound fades away and the IrDa send sound fades in. Similar techniques can be utilized in a haptic UI (i.e. in a user interface based on the sense of touch).

It is to be understood that all of the present figures, and the accompanying narrative discussions of various embodiments, do not purport to be completely rigorous treatments of the method and apparatus under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software which need not be further detailed herein.

What is claimed is:

1. A method comprising:
   sensing a press of a button at a device;
   indicating in response to said press of the button that a first action functionality is available by release of said button;
   performing said first action functionality if the button has been released before the second action functionality becomes available;
   indicating if said button remains pressed that a second action functionality becomes available by a later release of the button;
   performing the second action functionality if the button remains pressed until said second action functionality becomes available and is released thereafter and if not released after a wait period providing a no-action function.

2. The method of claim 1,
   wherein said press comprises a short press for a time period,
   wherein the button remaining pressed longer than the time period of the short press comprises a long press,
   wherein the indicating of the first action availability during the short press includes also the indication that the second action functionality becomes available by a later release of the button is consistent with pressing the button longer, and
   wherein neither the first action functionality nor the second action functionality is a do-nothing functionality.

3. The method of claim 1, wherein the indicating that the second action functionality becomes available by a later release of the button is provided with greater emphasis nearer to said second action functionality becoming available.

4. The method of claim 1, wherein said indicating availability of said first action functionality comprises briefly indicating a first icon unless the user keeps the button pressed in which case a second icon indicative of the second action functionality fades-in alongside the first icon until the first icon vanishes at which time the second action functionality is available by release of the button.

5. The method of claim 4, further comprising instead of providing said no-action function, transitioning to a next available action functionality if said button is still not released after said second action functionality is made available.

6. The method of claim 1, further comprising hastening the second functionality action, in response to user input.

7. The method of claim 6, wherein the hastening is caused by at least one of the following: applying extra pressure to the button, making a sound if the device is capable of audio recognition, and pressing another button.

8. The method of claim 1, wherein the first action functionality and the second action functionality are separated by an intermediate action functionality which provides a no action option.

9. The method of claim 1, further comprising avoiding the first action functionality and the second action by receiving a sound input from a user of the device if the device is capable of audio recognition, or by pressing another button.

10. The method of claim 1,
    wherein said press comprises a soft press,
    wherein the second action functionality becomes available by a hard press that applies greater pressure to the button than the soft press,
    wherein information indicates during the soft press that the second action functionality is made available by pressing the button harder, and
    wherein neither the first action functionality nor the second action functionality is a do-nothing function.

11. The method of claim 10, wherein further ranges of the pressure correspond to further respective action functionalities.

12. The method of claim 10, wherein a selected action functionality corresponds to a latest range of pressure accessed prior to release of the button, and
    wherein accessing a range briefly during release of the button is ineffective for selecting an action functionality.

13. The method of claim 1, wherein information about the second action functionality is provided while the first action functionality is performable.

14. A computer readable medium encoded with a software data structure for installation in a device for providing infor mation to a user about operation of a button of the device, wherein:
- a press of the button is sensed and the device provides an indication to the user that a first action functionality is available by release of said button,
- wherein the first action functionality is performed if the button has been released before a second action functionality becomes available,
- indicating the second action functionality becomes available by a later release of the button;
- and wherein the second action functionality is performed if the button remains pressed until said second action functionality becomes available and is released thereafter and if not released after a wait period providing a no-action function.

15. The computer readable medium of claim 14, wherein information about the second action functionality is provided while the first action functionality is performable.

16. An apparatus comprising:
- a sensor configured to sense a press of a button, said device providing a first indication to a user that a first action functionality is available by release of said button;
- a first action realization unit, configured to perform said first action functionality if the button has been released before a second action functionality becomes available but if not released before said second action functionality becomes available providing a second indication to the user that said second action functionality becomes available by a later release of the button;
- a second action realization unit, configured to perform the second action functionality if the button remains pressed until said second action functionality becomes available and is released thereafter and if not released after a wait period providing a no-action function; and
- a user interface configured to provide said first indication and said second indication to the user about operation of the button, during the operation of the button and before activation of any of said first action functionality and said second action functionality,
- wherein the user interface is configured to provide said first indication and said second indication during the operation of the button.

17. The apparatus of claim 16,
- wherein the button remaining pressed longer than the short press comprises a long press,
- wherein the second indication during the short press that the second action functionality is available is consistent with pressing the button longer, and
- wherein neither the first action functionality nor the second action functionality is a do-nothing function.

18. The apparatus of claim 16, wherein the user interface is configured to provide the second indication with greater emphasis nearer to a transition between the first indication and the second indication.

19. The apparatus of claim 16, wherein said first indication comprises briefly indicating with a first icon indicative of the first action functionality unless the user keeps the button pressed in which case the second indication is provided as a fade-in of a second icon indicative of the second action functionality and provided alongside the first icon until the first icon vanishes after which the second action functionality is made available by release of the button.

20. The apparatus of claim 16, wherein said first icon comprises a wireless reception icon and the second icon comprises a wireless transmission icon.

21. The apparatus of claim 16, wherein instead of providing said no-action function, transitioning to a next available action functionality if said button is still not released after said second action functionality is made available.

22. The apparatus of claim 16, configured to hasten the second functionality action, in response to user input.

23. The apparatus of claim 22, configured to hasten by at least one of the following: applying extra pressure to the button, making a sound if the device has audio recognition capability, and pressing another button.

24. The apparatus of claim 16, wherein the first action functionality and the second functionality are separated by an intermediate action functionality which provides a no action option.

25. The apparatus of claim 16,
- wherein said press comprises a soft press,
- wherein the second action functionality becomes available by a hard press that applies greater pressure to the button than the soft press,
- wherein the information indicates during the soft press that the second action functionality is made available by pressing the button harder, and
- wherein neither the tint action functionality nor the second action functionality is a do-nothing function.

26. The apparatus of claim 25, wherein further ranges of the pressure correspond to further respective action functionalities.

27. The apparatus of claim 25,
- wherein a selected action functionality corresponds to a latest range of pressure accessed prior to release of the button, and
- wherein accessing a range briefly during release of the button is ineffective for selecting an action functionality.

28. An apparatus comprising:
- means for sensing a press of a button, said apparatus providing a first indication to a user that a first action functionality is available by release of said button;
- means for performing a first action functionality if the button has been released before a second functionality becomes available but if not released before said second action functionality becomes available providing a second indication to the user that said second action functionality is available by release of said button;
- means for performing said second action functionality if the button remains pressed until said second functionality becomes available and is released thereafter and, if not released after a wait period, providing a no-action function.

29. The apparatus of claim 28,
- wherein said press comprises a short press for a time period,
- wherein the button remaining pressed longer than the time period of the short press comprises a long press,
- wherein the first indication during the short press includes also the second indication, and
- wherein neither the first action functionality nor the second action functionality is a do-nothing function.

30. The apparatus of claim 28,
- wherein said press comprises a soft press,
- wherein the second action functionality becomes available by a hard press that applies greater pressure to the button than the soft press,
- wherein the first indication indicates during the soft press that the second action functionality is made available pressing the button harder, and
- wherein neither the first action functionality nor the second action functionality is a do-nothing function.

31. The apparatus of claim 16, configured to provide said second indication while the first indication is provided.

32. The apparatus of claim 28, configured to provide said second indication while the first indication is provided.

* * * * *